United States Patent [19]

Bennett et al.

[11] 4,097,459

[45] * Jun. 27, 1978

[54] METHOD FOR PREPARING POLYPHENYLENE ETHERS

[75] Inventors: James G. Bennett; Glenn D. Cooper, both of Delmar, N.Y.

[73] Assignee: General Electric Company, Pittsfield, Mass.

[ * ] Notice: The portion of the term of this patent subsequent to Sep. 24, 1991, has been disclaimed.

[21] Appl. No.: 428,450

[22] Filed: Dec. 26, 1973

[51] Int. Cl.$^2$ .............................................. C08G 65/44
[52] U.S. Cl. .................................................. 260/47 ET
[58] Field of Search ................................... 260/47 ET

[56] References Cited

U.S. PATENT DOCUMENTS

| 3,306,875 | 2/1967 | Hay ....................................... 260/47 |
| 3,838,102 | 9/1974 | Bennett et al. .......................... 260/47 |

OTHER PUBLICATIONS

Chem. Abstr. Seventh Coll. Ind, Oct. 1969 (pp. 8937S–8938S & 23,337S).
Chem. Abstr. 8th Coll. Index, Mar. 1973 (p. 12180S).

*Primary Examiner*—Harold D. Anderson
*Assistant Examiner*—E. A. Nielsen
*Attorney, Agent, or Firm*—Morgan, Finnegan, Pine, Foley & Lee

[57] ABSTRACT

An improved process is disclosed for preparing polyphenylene ethers in which a polyamine complexing agent is employed to terminate the oxidative coupling reaction and to remove the metal component of the catalyst from the polymer.

13 Claims, No Drawings

METHOD FOR PREPARING POLYPHENYLENE ETHERS

This invention relates to the oxidative coupling of phenols, and more particularly, to the use of a polyamine complexing agent for the termination of such a reaction and removal of the metal catalyst from the polymer.

BACKGROUND OF THE INVENTION

The polyphenylene ethers and processes for their preparation are known in the art and described in numerous publications including Hay, U.S. Pat. Nos. 3,306,874 and 3,306,875. Other procedures are described in Bennett and Cooper, U.S. Pat. Nos. 3,639,656, 3,642,699 and 3,661,848. All of these patents are incorporated by reference.

The processes most generally used to produce the polyphenylene ethers involve the self-condensation of a monovalent phenol in the presence of an oxygen-containing gas and a catalyst.

At the conclusion of the reaction, the reaction solutions obtained, e.g., by oxidizing 2,6-xylenol with a copper-amine catalyst, are extracted with aqueous mineral acid or acetic acid or a mixture of water and carbon dioxide to remove the metallic component of the catalyst and the amine, before isolation of the polymer by precipitation with an antisolvent, such as methanol. It is important to remove the metallic catalyst residue from the polymer because contamination of the polymer by metallic residues results in discoloration and degradation.

The use of aqueous acid is objectionable, as it necessitates a separate extraction step to remove copper and the use of an alkali metal hydroxide to recover amine from the aqueous acid extracts. The use of the polyamie complexing agent permits the removal of the metal catalyst without a separate extraction step.

DESCRIPTION OF THE INVENTION

According to the present invention, in a process for forming a polyphenylene ether by an oxidative coupling reaction in the presence of a metal ion-amine catalyst comprising passing an oxygen-containing gas through a reaction solution and said catalyst, there is provided the improvement which comprises separating the catalyst from the polyphenylene ether by the addition of a sufficient amount of a polyamine complexing agent to produce a mixture of polyamine catalyst complex and polyphenylene ether and thereater separating the polyphenylene ether from the mixture, preferably by adding an antisolvent for the polyphenylene ether to precipitate said polyphenylene ether.

The term "polyphenylene ether" includes those polymers disclosed and claimed in Hay, U.S. Pat. Nos. 3,306,874 and 3,306,875, whenever produced by an oxidative coupling reaction comprising passing an oxygen-containing gas through a reaction solution.

In general, the polyphenylene ether resins will be of the formula

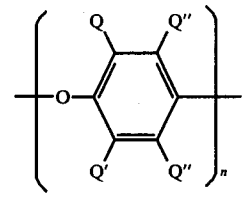

wherein Q is a monovalent substituent such as hydrogen, a hydrocarbon radical, a halohydrocarbon radical having at least two carbon atoms between the halogen atom and the phenol nucleus hydrocarbonoxy radicals and halohydrocarbonoxy radicals having at least two carbon atoms between the halogen atom and the phenol nucleus, Q' and Q''0 are the same as Q, and in addition, halogen with the proviso that Q, Q' and Q'' are all free of a tertiary alpha-carbon atom, and $n$ is a whole integer equal to at least 50.

The polyphenylene ethers are made by treating a solution of the corresponding phenol, optionaly substituted with chlorine, bromine or iodine in the para-position, with an oxygen-containing gas in the presence of a metal-amine complex catalyst. The metal component can comprise copper, manganese, cobalt, nickel, vanadium, chromium and salts thereof, but copper is preferred. Primary, secondary and tertiary amines may be used as the amine component of the catalyst.

The reaction solvent can be a halogenated aliphatic solvent, e.g., trichloroethylene, or an aromatic solvent, e.g., benzene, toluene, xylene, chlorobenzene, nitrobenzene, and the like, as well as many others which will be obvious to those skilled in this art. Expecially preferred solvents are aromatic hydrocarbons, e.g., toluene or benzene.

The polyphenylene ether-forming reaction can be carried out under a wide variety of well known process conditions. Merely by way of illustration, a copper halide can be mixed with an aliphatic amine in an aromatic solvent, then oxygen or an oxygen-containing gas can be introduced while the appropriate phenol is fed into the agitated reaction mixture at a moderate temperature, for example, in the range of 25°–50° C. The degree of polymerization is primarily controlled by the reaction time, although catalyst activity, promotors, temperature, oxygen flow rate and other parameters have known effects. To save unnecessarily detailed explanation of these known process details, reference is made to the above-mentioned Cooper or Hay patents.

At the point where the polymerization reaction reaches the desired yield, and the polymer reaches a desired molecular weight, the reaction solution will comprise a solution of polyphenylene ether, typically from 1 to 30% by weight and usually from 5 to 25% by weight, metal and amine, typically from about 0.005 to 1.5% by weight of metal, from about 0.1 to about 6.0% by weight of amine and minor amounts of other materials, such as various promotors, byproducts, unreacted monomer and the like. Such reaction solutions are then treated with the complexing agents in accordance with the present process.

The polyamine complexing agent is selected from compounds of the formula:

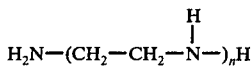

$$H_2N-(CH_2-CH_2-\overset{H}{\underset{|}{N}}-)_nH$$

wherein *n* is a positive integer of from 1 to 10, preferably from 1 to 4, and mixtures thereof.

These compounds include ethylenediamine, diethylenetriamine, triethylenetetramine and tetraethylenepentamine.

The manner of contacting the reaction solution with the polyamine is not critical to the invention. For example, the polyamine may be added in one portion to the reaction mixture. The complexed catalyst component can then be extracted by the water produced in the polymerization reaction by centrifuging and decanting.

On the other hand, the polyamine may be added in two or more portions, with additional water, above and beyond that produced in the polymerization reaction. After each contact, liquid-liquid extraction may be accomplished in suitable process equipment, e.g., a decantation tank, by stirring, separating the layers, and/or centrifuging and decanting.

In any event, washing the reaction mixture with water after contacting with the chelating agent has a beneficial effect on reducing the amount of metal ultimately found in the polymer.

In addition to batch-type extractions, the present process is applicable to continuous liquid-liquid extraction. For example, the reaction solution can be contacted in an extraction column of the multistage type using an aqueous stream of complexing agent as an extractant. Most efficiently, this will be done in a countercurrent fashion. The reaction mixture in toluene solution can be introduced into the bottom of a column to pass upwardly against a downwardly flowing aqueous stream of chelating agent. Polymer solution substantially free of copper residue can be recovered from the top of the column. The factors controlling the use and efficiency of such columns are well known to those skilled in the art, and to save unnecessarily detailed explanation, the disclosure in Modan, U.S. 3,630,995 which describes the use of such columns using aqueous acids (which are not complexing agents) as an extractant is incorporated herein by reference.

Although relatively large amounts of the polyamine complexing agents can be used, e.g., from 0.1 mole to about 100 moles per mole of metal ion in the reaction solution, it is economically advantageous to select an amount which is sufficient to provide from about 0.25 to about 10 moles and preferably about 1 0 to about 6.0 moles of chelating agent per mole of metallic catalyst component.

In batch-type processes, the time of contact can vary widely, e.g., from 1 or 2 minutes up to 48 hours or more. Generally speaking, however, stirring for about 5 minutes to about 2 hours will be sufficient.

In the continuous multistage liquid-liquid extraction embodiments, the polyamine complexing agents may be used in aqueous solution at concentrations which give good extraction efficiency, e.g., from about 1 to about 40% by weight in water. The lower concentrations, e.g., from about 1 to about 10% by weight, are preferred and it is desirable that the ratio of the organic phase or reaction solution to the aqueous phase or chelating agent solution vary between 50:1 and 15:1 with the higher ratios being used at higher concentrations of the polyamine complexing agent in the aqueous phase.

The manner of isolating the polyphenylene ether from the solution after removal of the metallic component as a polyamine complex is not critical to the invention. For example, the polyphenylene ether can be isolated by precipitation from a reaction solution with an antisolvent such as an excess of an alcohol, i.e., methanol. The filtered product can be slurried in alcohol, and if desired, with a decolorizing agent and then the polyphenylene ether is filtered off and converted to films, fibers, molded articles and the like by conventional methods. Other alcohols such as isopropanol, propanol or ethanol may be employed.

The amine component of the catalyst can be recovered by distillation or other conventional procedures.

As has been mentioned, a preferred aspect of the present process is to prepare polyphenylene ether solutions of low metal content, from which the polymers are recovered by the so-called total isolation procedures, e.g., spray drying, steam precipitation and hot water crumbing. This facilitates commercial application of such processes, which are more economical with respect to process energy requirements, solvent losses, and the like, than the precipitation methods of the prior art.

According to one feature of the invention, the polymer is recovered by a spray-drying total isoltion procedure which comprises terminating the oxidative coupling reaction and removing the metal component of the catalyst residue from the reaction solution by liquid-liquid contact with the aqueous solution of the polyamine chelating agent, separating the so-treated reaction solution, and thereafter, spray-drying the reaction solution to produce the polyphenylene ether in a discrete particulate form.

A particularly useful feature of this invention is that when methanol is used to precipitate the polymer the extraction step may be completely eliminated. Extraction of the polymer solution is difficult because of the high viscosity of the solution and the tendency of the polymer to precipitate from solution. For efficient extraction, it is usually necessary to limit the polymer concentration in the solution to about 10%. With the polyamines of this invention no extraction step is required. The polyamine is mixed with the reaction mixture and methanol is added to precipitate the polymer and wash out the copper-polyamine complex. A major advantage of this procedure is that it can be used with concentrated polymer solutions, thus greatly reducing the amount of solvent and antisolvent required and reducing the cost of recovery of solvent and antisolvent.

DESCRIPTION OF THE PREFERRED EMBODIMENTS

The following examples serve to illustrate the invention, but they are not intended to limit it thereto, the parts being by weight, unless otherwise stated.

EXAMPLE 1

Using standard techniques, 2,6-xylenol was reacted with oxygen in toluene solution, using as catalyst a mixture of cupric chloride, sodium bromide, and di-n-butyl amine. The reaction mixture contained 16 wt. % PP0 and had 0.006 g of copper (calculated as cupric chloride, on the basis of the initial catalyst charge) for each gram of polymer.

One hundred grams of the reaction mixture was stirred for five minutes in a Waring blendor with 210 ml of methanol containing 6% water. The precipitated polymer was filtered of, reslurried with 40 ml of methanol and again filtered. The polymer was washed on the filter with 50 ml of methanol and dried under vacuum. The copper content, determined by atomic absorption measured on a solution of the polymer in chlorobenzene, was 2110 parts per million. Other 100 gram portions of the reaction mixture was stirred for five minutes with ethylenediamine, diethylenetriamine, etc. and then precipitated and washed in the same way. The copper content of each sample is reported in Table I.

TABLE I

| Polyamine | Molar ratio, amine:Cu | Cu in polymer (ppm) |
|---|---|---|
| None | — | 2110 |
| ethylene diamine | 4:1 | 160 |
| diethylenetriamine | 2:1 | 70 |
| triethylenetetramine | 1:1 | 270 |
| " | 2:1 | 11 |
| tetraethylenepentamine | 2:1 | 40 |

EXAMPLE 2

A reaction mixture containing poly(1,4-phenylene ether) and similar to that described in Example 1 was contacted with triethylenetetramine by pumping the polymer solution and 10% solution of triethylenetetramine in toluene through a Kenics mixer, with the pumping rate of the two solutions adjusted to produce a 2:1 molar ratio of amine to copper. The mixture was then mixed with methanol to precipitate the polymer, which was filtered off, washed with methanol, and dried; it contained 25 parts per million of copper. A blend composed of 50 parts of this polymer, 50 parts of rubber modified polystyrene, 3 parts of triphenyl phosphate, 1.5 parts low molecular weight polyethylene was extruded at 600° F in a 28 mm twin-screw extruder, and the extruded pellets were injection molded into standard test bars. The physical properties of this blend were not significantly different from those of a blend similarly prepared from PPO isolated after extraction of the copper catalyst by extraction with acetic acid.

| Property | Acetic-Acid Extracted | Copper Removed with TETA |
|---|---|---|
| Elongation (%) | 69 | 82 |
| Tensile yield (psi) | 9,000 | 9,000 |
| Tensile strength (psi) | 8,100 | 8,200 |
| Izod Impact (ft./lbs./in. of notch) | 3.3 | 3.3 |
| Gardner impact (in. lbs.) | 100 | 140 |
| Heat Distortion Temp. (° F) | 248 | 255 |

EXAMPLE 3

Poly(1,4-phenylene ether) was prepared in a tube reaction vessel equipped with a Vibro mixer stirrer and an oxygen inlet by adding 0.144 g of cuprous bromide, 1.68 ml of di-n-butylamine and 140 ml of toluene. The mixture was stirred for 5 min., after which 10.0 g of 2.6-xylenol were added. Oxygen was passed through the stirred reaction mixture while maintaining the temperature at 25° C. After 30 min., 0.14 g of triethylenetetramine were added. The solution viscosity did not increase after the addition of the triethylenetetramine. After 120 minutes the reaction mixture was filtered through glass wool and the polymer precipitated directly with methanol. The polymer was green in color when precipitated but immediately turned white upon slurrying in methanol. The dried polymer had a color of 1.8 and contained 8 ppm of copper.

The invention in its broader aspects is not limited to the specification, methods, steps and improvements shown and described herein, but departures may be made within the scope of the accompanying claims without departing from the principles of the invention and without sacrificing its chief advantages.

We claim:

1. In a process for forming a polyphenylene ether by an oxidative coupling reaction in the presence of a catalyst which comprises a complexed metal ion and an amine, said process comprising passing an oxygen-containing gas through a reaction solution of a phenol and said catalyst, the improvement which comprises separating the catalyst from the polyphenylene ether by the addition of a sufficient amount of a complexing agent selected from compounds of the formula

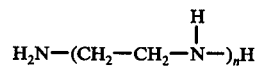

and mixtures thereof wherein n is a positive integer of from 1 to 10, to produce a mixture of a complexed catalyst and the polyphenylene ether and thereafter separating the polyphenylene ether from said mixture.

2. A process as defined in claim 1 wherein said polyphenylene ether is of the formula

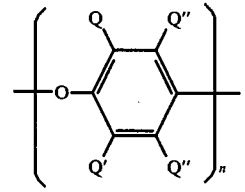

wherein
Q is a hydrocarbon radical, a halohydrocarbon radical having at least two carbon atoms between the halogen atom and the phenol nucleus, a hydrocarbonoxy radical or a halohydrocarbonoxy having at least two carbon atoms between the halogen atom and the phenol nucleus; and
Q' and Q" are the same as Q and, in addition halogen, provided that Q, Q' and Q" are all free of tertiary alpha-carbon atom, and n is at least 50.

3. A process as defined in claim 1 wherein Q and Q' are hydrocarbon radicals having from 1 to 8 carbon atoms and Q" are each hydrogen.

4. A process as defined in claim 1 wherein Q and Q' are each methyl radicals.

5. A process as defined in claim 1 wherein said metal ion is copper.

6. A process as defined in claim 1 wherein said amine is a primary or secondary amine.

7. A process as defined in claim 1 wherein said polyamine complexing agent is ethylene diamine.

8. A process as defined in claim 1 wherein said polyamine complexing agent is diethylenetriamine.

9. A process as defined in claim 1 wherein said polyamine complexing agent is triethylenetetramine.

10. A process as defined in claim 1 wherein said polyamine is tetraethylenepentamine.

11. A process as defined in claim 1 wherein the polyphenylene ether is separated from the mixture of polyamine catalyst complex by the addition of an antisolvent.

12. A process as defined in claim 11 wherein the antisolvent is methanol.

13. In a process for forming a polyphenylene ether by an oxidative coupling reaction in the presence of a catalyst which comprises a complexed copper ion and an amine, said process comprising passing an oxygen-containing gas through a reaction solution of a phenol and said catalyst, the improvement which compriss separating the catalyst from the polyphenylene ether by the addition of a sufficient amount of a complexing agent selected from compounds of the formula

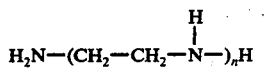

and mixtures thereof wherein $n$ is a positive integer of from 1 to 10, to produce a mixture of a complexed catalyst and the polyphenylene ether, separating said complexed catalyst from the reaction mixture and thereafter separating the polyphenylene ether from said mixture.

* * * * *

UNITED STATES PATENT AND TRADEMARK OFFICE
CERTIFICATE OF CORRECTION

PATENT NO. : 4,097,459

DATED : June 27, 1978

INVENTOR(S) : James G. Bennett and Glenn D. Cooper

It is certified that error appears in the above-identified patent and that said Letters Patent are hereby corrected as shown below:

In column 1, line 41, change "polyamie" to -- polyamine --.

In column 1, line 56, change "thereater" to --thereafter--.

In column 2, line 18, "0" after Q" should be deleted.

In column 2, line 23 change "optionaly" to --optionally--.

In column 3, line 51, after "about" the number "1 0" should be --1.0--.

In column 4, line 8, after "desired," insert --stirred--.

UNITED STATES PATENT AND TRADEMARK OFFICE
CERTIFICATE OF CORRECTION

PATENT NO. : 4,097,459
DATED : June 27, 1978
INVENTOR(S) : James G. Bennett and Glenn D. Cooper It is certified that error appears in the above-identified patent and that said Letters Patent are hereby corrected as shown below:

In column 4, line 26, change "isoltion" to --isolation--.

In column 5, line 2, "of" (first occurrence) should be --off--.

In column 5, line 8, "was" should be --were--.

In column 7, line 12, change "compriss" to --comprises--.

Signed and Sealed this

Thirty-first Day of July 1979

[SEAL]

Attest:

*Attesting Officer*

LUTRELLE F. PARKER
*Acting Commissioner of Patents and Trademarks*